(12) United States Patent
Tuhro

(10) Patent No.: US 11,511,587 B2
(45) Date of Patent: Nov. 29, 2022

(54) INTEGRATED CROSSLINK VALVE

(71) Applicant: Continental Automotive Systems Inc., Auburn Hills, MI (US)

(72) Inventor: Matthew Conrad Tuhro, Sault Ste. Marie, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 418 days.

(21) Appl. No.: 16/688,042

(22) Filed: Nov. 19, 2019

(65) Prior Publication Data

US 2020/0207175 A1 Jul. 2, 2020

Related U.S. Application Data

(60) Provisional application No. 62/785,267, filed on Dec. 27, 2018.

(51) Int. Cl.
*B60G 17/052* (2006.01)
*B60G 17/015* (2006.01)

(52) U.S. Cl.
CPC ....... *B60G 17/0155* (2013.01); *B60G 17/052* (2013.01); *B60G 17/0525* (2013.01); *B60G 17/0526* (2013.01); *B60G 2202/152* (2013.01); *B60G 2202/314* (2013.01); *B60G 2204/111* (2013.01); *B60G 2400/252* (2013.01); *B60G 2500/30* (2013.01)

(58) Field of Classification Search
CPC .............. B60G 17/0155; B60G 17/052; B60G 17/0525; B60G 17/0526; B60G 2202/152; B60G 2202/314; B60G 2204/111; B60G 2400/252; B60G 2500/30
USPC ................................................... 280/124.158
See application file for complete search history.

(56) References Cited

U.S. PATENT DOCUMENTS 4,877,223 A * 10/1989 Hackett ................ B60G 17/044
267/64.18
6,322,058 B1 * 11/2001 Tanigawa ............... B60G 15/12
188/269

(Continued)

*Primary Examiner* — Toan C To

(57) ABSTRACT

An air spring suspension system includes a first air spring that has a first volume with a first pressure that is configured to provide a first spring stiffness to a first suspension assembly. A second air spring has a housing with a second volume with a second pressure that is configured to provide a second spring stiffness to a second suspension assembly. The second air spring includes a piston that is arranged in the second volume. One of the housing and the piston includes a first mounting structure that is configured to connect to a vehicle chassis. Another of the housing and the piston includes a second mounting structure that is configured to connect to the second suspension assembly. The second air spring also includes a fluid connection on the housing. The second air spring further includes a crosslink valve that is disposed in the housing and movable between open and closed positions. The crosslink valve is configured to selectively fluidly connect the second volume to the fluid connection. A crosslink line is fluidly connected to the first volume of the first air spring and the fluid connection on the second air spring. A controller is in communication with the crosslink valve. The controller is configured to command the crosslink valve between the open and closed positions in response to an input.

15 Claims, 2 Drawing Sheets

(56) References Cited

U.S. PATENT DOCUMENTS

| | | | |
|---|---|---|---|
| 7,287,760 B1* | 10/2007 | Quick | B60G 17/08 |
| | | | 701/40 |
| 7,677,339 B2* | 3/2010 | Oscarsson | B62D 61/125 |
| | | | 180/209 |
| 8,006,963 B2 | 8/2011 | Gleu | |
| 8,271,159 B2 | 9/2012 | Krober et al. | |
| 8,973,932 B2 | 3/2015 | Pielock | |
| 2003/0085535 A1* | 5/2003 | Choi | B60G 17/0485 |
| | | | 280/5.514 |
| 2007/0290461 A1* | 12/2007 | Oscarsson | B60G 17/0485 |
| | | | 280/6.15 |
| 2010/0109276 A1* | 5/2010 | Marjoram | B60G 99/002 |
| | | | 280/124.157 |
| 2010/0270760 A1* | 10/2010 | Lloyd | B60G 17/0523 |
| | | | 280/5.514 |
| 2011/0218707 A1* | 9/2011 | Inoue | B60G 17/0182 |
| | | | 280/124.157 |
| 2012/0187640 A1* | 7/2012 | Kondo | B60G 13/14 |
| | | | 280/5.514 |
| 2014/0049013 A1* | 2/2014 | Dehmel | B60G 15/10 |
| | | | 267/64.28 |
| 2014/0070467 A1* | 3/2014 | Dehmel | B60G 11/58 |
| | | | 267/64.17 |
| 2014/0095025 A1* | 4/2014 | Gambrall | B60G 17/0155 |
| | | | 701/37 |
| 2019/0084365 A1* | 3/2019 | Oishi | B60G 17/052 |
| 2019/0359024 A1* | 11/2019 | Weber | F16F 9/43 |
| 2022/0032707 A1* | 2/2022 | Yoshida | B60G 17/019 |

\* cited by examiner

INTEGRATED CROSSLINK VALVE

CROSS-REFERENCE TO RELATED APPLICATIONS

This application claims priority to U.S. Provisional Application No. 62/785,267, which was filed on Dec. 27, 2018.

BACKGROUND

Air suspensions are becoming more widely used in both on-highway and off-highway vehicle suspension systems. These suspensions enable load leveling and adjustable ride comfort features.

One type of air suspension system 10 shown in FIG. 1 selectively interconnects the volumes of different air springs 12, 14 to one another. Unsprung masses 24a, 24b, such as control arms, wheels and tires, are respectively supported by the air springs 12, 14 relative to a frame 11 of the vehicle. In one example configuration, multiple air springs located at different corners of the vehicle are fluidly connected to one another by a fluid line 16 having a separate, external crosslink valve 18. When the crosslink valve 18 is open, a softer ride is provided as the volume from one air spring is supplemented by the volume of the other air spring during compression. Conversely, when the crosslink valve 18 is closed, a firmer ride is provided by those air springs.

The fluid line 16, which is commonly an external metal tube, and the crosslink valve 18 are typically secured to the vehicle chassis at a location remote from the air springs, which requires vehicle packaging space.

SUMMARY

In one exemplary embodiment, an air spring suspension system includes a first air spring that has a first volume with a first pressure that is configured to provide a first spring stiffness to a first suspension assembly. A second air spring has a housing with a second volume with a second pressure that is configured to provide a second spring stiffness to a second suspension assembly. The second air spring includes a piston that is arranged in the second volume. One of the housing and the piston includes a first mounting structure that is configured to connect to a vehicle chassis. Another of the housing and the piston includes a second mounting structure that is configured to connect to the second suspension assembly. The second air spring also includes a fluid connection on the housing. The second air spring further includes a crosslink valve that is disposed in the housing and movable between open and closed positions. The crosslink valve is configured to selectively fluidly connect the second volume to the fluid connection. A crosslink line is fluidly connected to the first volume of the first air spring and the fluid connection on the second air spring. A controller is in communication with the crosslink valve. The controller is configured to command the crosslink valve between the open and closed positions in response to an input.

In a further embodiment of any of the above, the first air spring is without a crosslink valve.

In a further embodiment of any of the above, the first and second air springs include a pair of front vehicle air springs.

In a further embodiment of any of the above, the first and second air springs include a pair of rear vehicle air springs.

In a further embodiment of any of the above, the first and second air springs include a pair of one front vehicle air spring and one rear vehicle air spring.

In a further embodiment of any of the above, the fluid connection is a second fluid connection. The housing includes a first fluid connection in fluid communication with the second volume. The housing further includes a pump and a reservoir that are configured to provide pressurized air to the first and second volumes via a main air line. The main air line is connected to the first fluid connection. The pump and the reservoir are not arranged fluidly between the first and second volumes via the crosslink line.

In a further embodiment of any of the above, the input is a user selected suspension mode.

In a further embodiment of any of the above, the crosslink valve blocks the second volume from the fluid connection in the closed position. The crosslink valve fluidly connects the second volume to the fluid connection in the open position.

In a further embodiment of any of the above, the crosslink valve is in the open position when the valve is electrically deenergized.

In a further embodiment of any of the above, an electrical connector is provided in the housing. The electrical connector is configured to provide the command to the crosslink valve to move the crosslink valve between the open and closed positions.

In a further embodiment of any of the above, the system includes a ride height sensor that is mounted to the suspension and is in communication with the controller. The ride height sensor is configured to determine a ride height based upon a position of the piston.

In another exemplary embodiment, an air spring includes a housing that has a volume with a piston. A pressure in the volume is configured to provide a spring stiffness. A crosslink valve is disposed in the housing and is configured to selectively fluidly connect the volume a fluid connection on the housing.

In a further embodiment of any of the above, the crosslink valve is movable between open and closed positions. The crosslink valve blocks the volume from the fluid connection in the closed position. The crosslink valve fluidly connects the volume to the fluid connection in the open position.

In a further embodiment of any of the above, the crosslink valve is in the open position when the valve is electrically deenergized.

In a further embodiment of any of the above, an electrical connector is provided by the housing. The electrical connector is configured to provide a signal to the crosslink valve to move the crosslink valve between the open and closed positions.

In a further embodiment of any of the above, one of the housing and the piston includes a first mounting structure that is configured to connect to a vehicle chassis. Another of the housing and the piston includes a second mounting structure that is configured to connect to an unsprung mass.

In a further embodiment of any of the above, the air spring includes a ride height sensor that is configured to determine a ride height based upon a position of the piston.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 2:
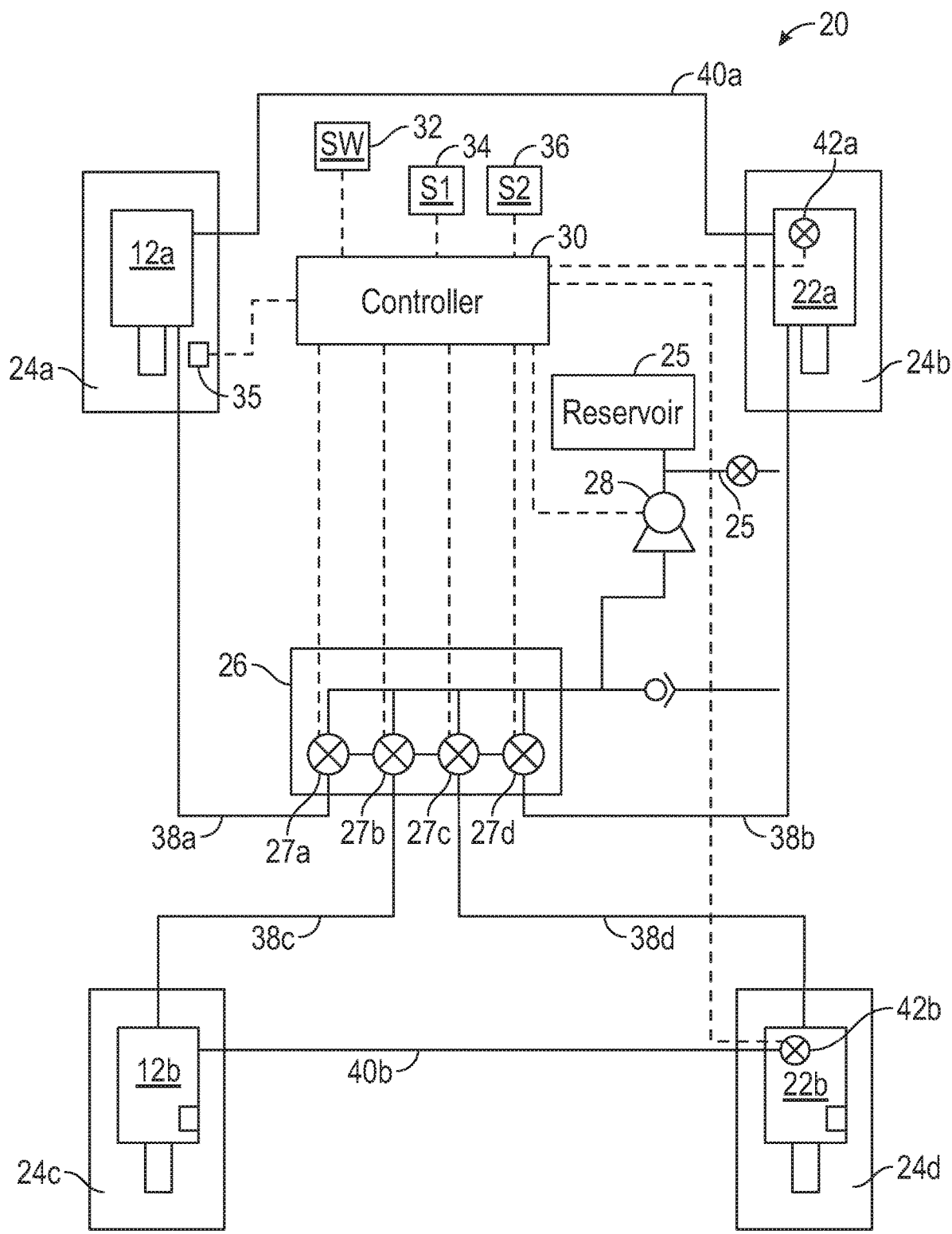
FIG. 2 is a schematic view of an air spring suspension system according to one embodiment of the disclosure.

A vehicle air spring suspension system 20 is schematically illustrated in FIG. 2. It should be understood that the system is highly schematic and greatly simplified. Accordingly, the system 20 may be varied from the embodiment shown and still fall within the scope of the disclosed embodiment. The system 20 includes left-front, right-front, left-rear, right-rear air springs 12a, 22a, 12b, 22b respectively supporting suspension assemblies that include wheels 24a, 24b, 24c, 24d in a known configuration at different corners of the vehicle.

In the disclosed example, some of the air springs (i.e., 12a and 12b, collectively "air springs 12") do not have an integrated crosslink valve and are configured much like a conventional air spring. Other air springs (i.e., 22a and 22b, collectively "air springs 22") do incorporate an integrated crosslink valve 42a, 42b, unlike prior art air springs, which is discussed in more detail below.

The system 20 includes a valve block 26 containing multiple fluid valves, for example, valves 27a, 27b, 27c, 27d (collectively, valves "27"). These valves 27 selectively supply and exhaust fluid from a pump 28 to the air springs 12, 22. More or fewer valves may be used, and these valves may be fluidly connected to the various components in a variety of configurations.

A controller 30 is in communication with the valves 27 and the pump 28. The valves 27 (e.g., 3-way valves) may also exhaust pressure directly or indirectly through a vent 25. Air is drawn in by the pump 28 through a check valve. A reservoir 29 may be provided, for example downstream from the pump 28, to provide a volume of pressurized air to the system 20. It should be understood that the system 20, its valves, and/or components may be configured differently than illustrated.

In one example, a manual switch 32 communicates with the controller to enable the vehicle operator to manually switch between modes, such as "soft" and "sport." Multiple sensors 34, 36 are in communication with the controller 30 to provide the controller 30 information concerning the vehicle, such as speed and vehicle dynamic information. Ride height sensors 35 (one shown) may be provided at each corner of the system 20 and may be mounted to the suspension and/or frame. In one example, the ride height sensor 35 is mounted on suspension linkages. The controller 30 also may contain algorithms that automatically control the air springs 12, 22 to provide desired vehicle handling characteristics under a variety of conditions.

In the example, main air lines 38a, 38b, 38c, 38d (generically referred to as a main air line "38") respectively fluidly interconnect the valves 27a, 27b, 27c, 27d to the air springs 12a, 22a, 12b, 22b.

The crosslinked air spring suspension system may be arranged in a suitable configuration. In the example disclosed, the left-front and right-front air springs 12a, 22a are interconnected by a front crosslink line 40a, and the left-rear and right-rear air springs 12b, 22b are interconnected by a rear crosslink line 40b. The front and rear crosslink lines 40a, 40b are referred to generically as a crosslink line "40".

Unlike the prior art arrangements, the crosslink valve is integrated into the air spring. Using the disclosed example, the right-front air spring 22a includes the crosslink valve 42a, and the right-rear air spring 22b includes the crosslink valve 42b. As a result, in this disclosed configuration, the air springs are handed. Integrating the crosslink valve into the air spring protects the valve, eliminates external fluid connections, and simplifies packaging and assembly.

Figure 1:
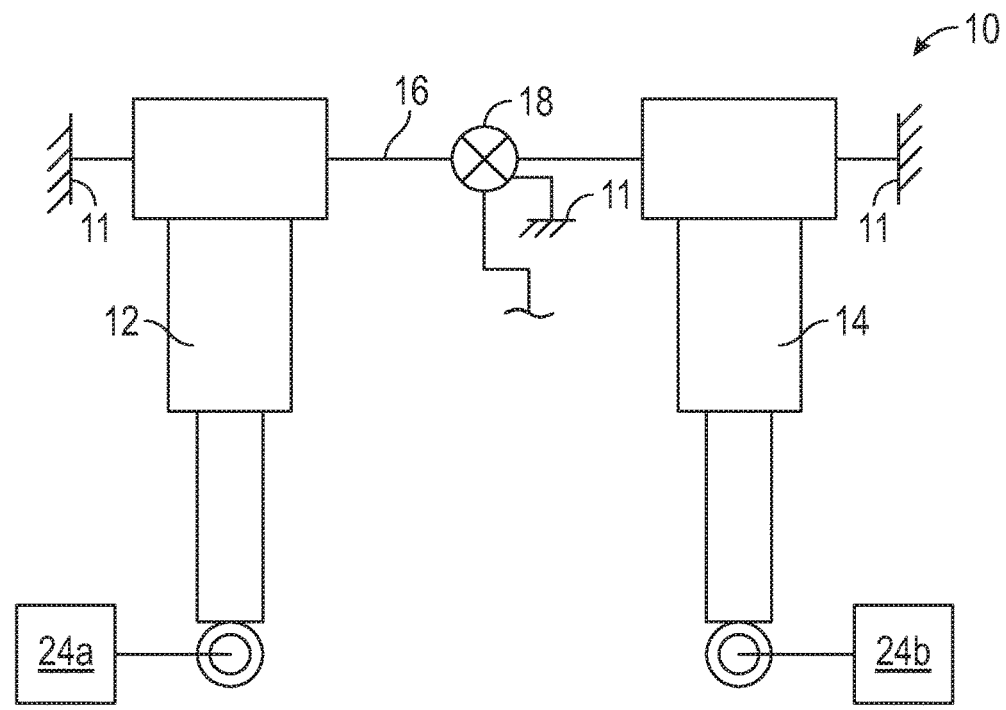
FIG. 1 is a schematic view of a prior art air spring system.
Figure 3:
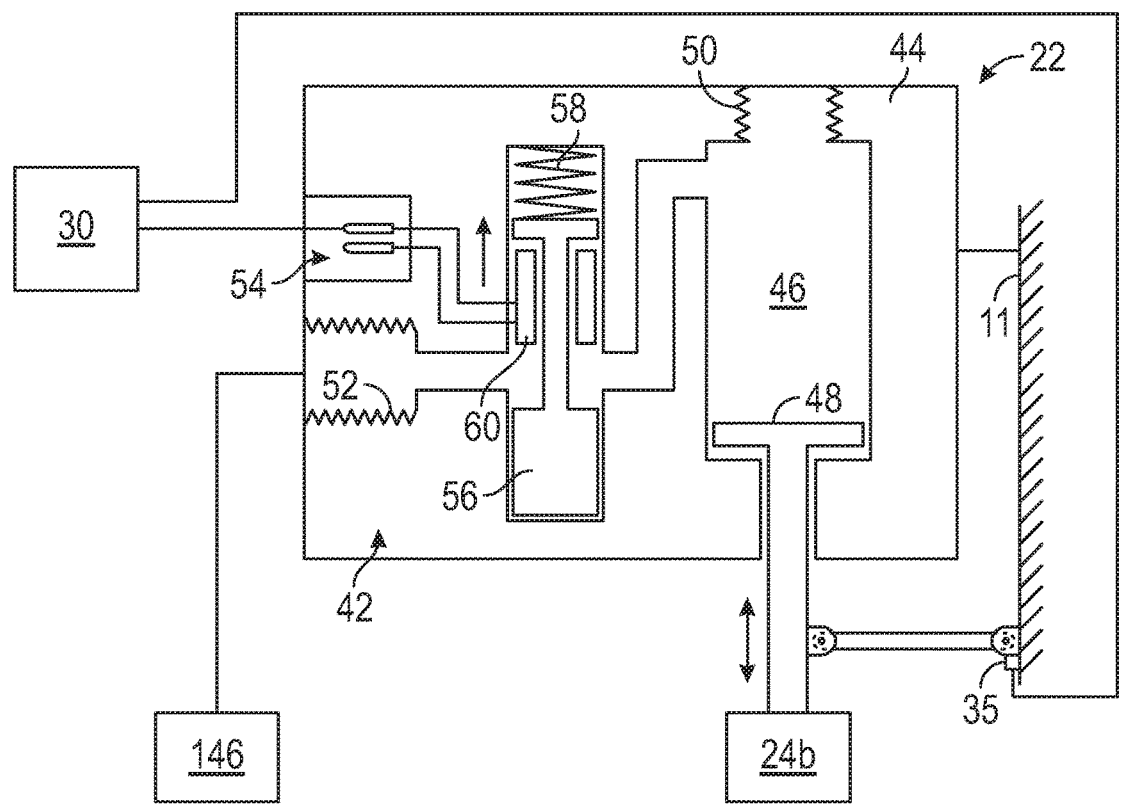
FIG. 3 is a schematic view of a portion of an air spring incorporating a crosslink valve.

FIG. 3 schematically depicts a crosslink valve integrated into the air spring 22. The air spring 22, which are supported relative to a vehicle chassis or frame 11, includes a housing 44 having a volume 46. The housing 44 provides a first mounting structure secured to, for example, the frame 11. A piston 48 is arranged in the volume 46, and movement of the piston 48 within the volume 46 provides the desired spring rate. In one example, the ride height position sensor 35 indirectly detects a position of the piston 48, which correlates with the ride height at that corner of the vehicle. The piston 48 is operatively secured to, for example, the unsprung mass in a second mounting structure. Although only one volume is shown in the example, multiple selectively, fluidly connectable volumes may be provided in the air spring.

A first fluid connection 50 is fluidly connected to the main air line 38. A second fluid connection 52 is provided in the housing 44 to fluidly connect to a volume 146 of another air spring 22 via a crosslink line 40. The crosslink valve 42 is illustrated as a spool valve configuration, although other types of valves might be used. The spool 56 is shown in a normally open position, which fluidly interconnects multiple air springs to one another, thus, combining the volumes of the air springs. A spring 58 biases the spool 56 to the normally open position. The spool 56 moves from the open position shown to a closed position by energizing a solenoid 60. An electrical connector 54 is connected to the controller 30, which provides a command in response to an input to selectively energize the solenoid 60 and move the valve 42 between the open and closed positions. The electrical connector 54 may be provided by the housing 44 either with a pigtail or with an electrical socket in the housing body. It should be understood that manually closed valves can be used if desired.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:
1. An air spring suspension system comprising:
a first air spring having a first volume with a first pressure that is configured to provide a first spring stiffness to a first suspension assembly;

a second air spring has a housing with a second volume with a second pressure that is configured to provide a second spring stiffness to a second suspension assembly, the second air spring comprising:
   a piston arranged in the second volume, wherein one of the housing and the piston includes a first mounting structure configured to connect to a vehicle chassis, and another of the housing and the piston includes a second mounting structure configured to connect to the second suspension assembly;
   a fluid connection on the housing; and
   a crosslink valve disposed in the housing and movable between open and closed positions, the crosslink valve configured to selectively fluidly connect the second volume to the fluid connection;
a crosslink line fluidly connected to the first volume of the first air spring and the fluid connection on the second air spring; and
a controller in communication with the crosslink valve, the controller configured to command the crosslink valve between the open and closed positions in response to an input.

2. The system of claim 1, wherein the first air spring is without a crosslink valve.

3. The system of claim 1, wherein the first and second air springs comprise a pair of front vehicle air springs.

4. The system of claim 1, wherein the first and second air springs comprise a pair of rear vehicle air springs.

5. The system of claim 1, wherein the first and second air springs comprise a pair of one front vehicle air spring and one rear vehicle air spring.

6. The system of claim 1, wherein the fluid connection is a second fluid connection, and the housing includes a first fluid connection in fluid communication with the second volume, and comprising a pump and a reservoir configured to provide pressurized air to the first and second volumes via a main air line, the main air line connected to the first fluid connection, and the pump and the reservoir is not arranged fluidly between the first and second volumes via the crosslink line.

7. The system of claim 1, wherein the input is a user selected suspension mode.

8. The system of claim 1, wherein the crosslink valve blocks the second volume from the fluid connection in the closed position, and the crosslink valve fluidly connects the second volume to the fluid connection in the open position.

9. The system of claim 8, wherein the crosslink valve is in the open position when the valve is electrically deenergized.

10. The system of claim 8, wherein an electrical connector is provided in the housing, the electrical connector configured to provide the command to the crosslink valve to move the crosslink valve between the open and closed positions.

11. The system of claim 1, comprising a ride height sensor is mounted to the suspension and is in communication with the controller, the ride height sensor configured to determine a ride height based upon a position of the piston.

12. An air spring comprising:
   a housing having a volume with a piston, wherein a pressure in the volume is configured to provide a spring stiffness;
   a crosslink valve is disposed in the housing and is configured to selectively fluidly connect the volume a fluid connection on the housing; and
   wherein the crosslink valve is movable between open and closed positions, the crosslink valve blocking the volume from the fluid connection in the closed position, and the crosslink valve fluidly connecting the volume to the fluid connection in the open position; and
   wherein an electrical connector is provided by the housing, the electrical connector configured to provide a signal to the crosslink valve to move the crosslink valve between the open and closed positions.

13. The air spring of claim 12, wherein the crosslink valve is in the open position when the valve is electrically deenergized.

14. The air spring of claim 12, comprising a ride height sensor configured to determine a ride height based upon a position of the piston.

15. An air spring comprising:
   a housing having a volume with a piston, wherein a pressure in the volume is configured to provide a spring stiffness; and
   a crosslink valve is disposed in the housing and is configured to selectively fluidly connect the volume a fluid connection on the housing, wherein one of the housing and the piston includes a first mounting structure configured to connect to a vehicle chassis, and another of the housing and the piston includes a second mounting structure configured to connect to an unsprung mass.

* * * * *